(12) United States Patent
Molineux

(10) Patent No.: US 11,359,755 B2
(45) Date of Patent: Jun. 14, 2022

(54) SANITIZING POUCH FOR ELECTRONICS

(71) Applicant: Donn Molineux, Newtown, PA (US)

(72) Inventor: Donn Molineux, Newtown, PA (US)

(*) Notice: Subject to any disclaimer, the term of this patent is extended or adjusted under 35 U.S.C. 154(b) by 1 day.

(21) Appl. No.: 17/079,333

(22) Filed: Oct. 23, 2020

(65) Prior Publication Data

US 2021/0054966 A1 Feb. 25, 2021

Related U.S. Application Data

(62) Division of application No. 16/213,699, filed on Dec. 7, 2018, now abandoned, which is a division of
(Continued)

(51) Int. Cl.
| | | |
|---|---|---|
| A41D 19/00 | (2006.01) | |
| F16L 55/105 | (2006.01) | |
| F16K 3/30 | (2006.01) | |
| F16L 57/06 | (2006.01) | |
| F16K 3/02 | (2006.01) | |
| E04C 3/02 | (2006.01) | |

(Continued)

(52) U.S. Cl.
CPC .............. *F16L 55/105* (2013.01); *E04C 3/02* (2013.01); *F16B 2/065* (2013.01); *F16B 45/00* (2013.01); *F16K 3/0236* (2013.01); *F16K 3/0281* (2013.01); *F16K 3/30* (2013.01); *F16L 57/06* (2013.01); *F16M 13/022* (2013.01)

(58) Field of Classification Search
CPC ......... B65D 33/00; A45C 11/00; A45C 15/00; A45C 2011/0002; F16L 55/105; F16L 57/06; F16K 3/30; F16K 3/0236; F16K 3/0281; F16M 13/022

USPC ......................................................... 224/217
See application file for complete search history.

(56) References Cited

U.S. PATENT DOCUMENTS 4,350,732 A * 9/1982 Goodwin ................ B32B 5/022
442/244
6,817,470 B1 * 11/2004 Goldberg ............. H01H 9/0242
206/320
(Continued)

OTHER PUBLICATIONS

Joanna Brenner, Pew Internet Mobile, Pew Internet: Mobile, http://pewinternet.org/ Commentary/2012/ February/Pew-Internet-Mobile.aspx, printed Oct. 16, 2012, date of publication unknown, 5 pages.
(Continued)

*Primary Examiner* — Todd M Epps
(74) *Attorney, Agent, or Firm* — Graham Casanova Alig; Alig Patent Law

(57) ABSTRACT

The present invention is an elastic (mechanically stretchable), sanitizing pouch configured to receive and hold an Electronic Device of a predetermined configuration. The elasticity of the fabric used maximizes surface contact with the Electronic Device and the closeness of the fabric of the invention with the outside surfaces of the Electronic Device. A liftable and removable cover flap on the front of the invention is used to hold and access the inside of the invention. The back of the invention includes at least one pocket. The invention further includes a pull tab to help lift an Electronic Device out of the invention. While inside the invention, the silver ions are released in the fabric and inhibit the colonization of bacteria, viruses and fungus on the Electronic Device.

20 Claims, 7 Drawing Sheets

Related U.S. Application Data application No. 13/908,668, filed on Jun. 3, 2013, now Pat. No. 9,140,397.

(51) Int. Cl.
  *F16B 2/06* (2006.01)
  *F16B 45/00* (2006.01)
  *F16M 13/02* (2006.01)

(56) References Cited

U.S. PATENT DOCUMENTS

| | | | |
|---|---|---|---|
| 7,290,654 B2 | 11/2007 | Hodges | |
| 7,311,441 B2 | 12/2007 | Weaver et al. | |
| 7,882,688 B2 * | 2/2011 | Indiano | D02G 3/449 |
| | | | 57/295 |
| 7,886,515 B2 * | 2/2011 | Indiano | D02G 3/04 |
| | | | 57/295 |
| 7,933,122 B2 * | 4/2011 | Richardson | H05K 5/0017 |
| | | | 455/90.3 |
| 7,987,979 B2 | 8/2011 | Havens et al. | |
| 8,204,561 B2 | 6/2012 | Mongan et al. | |
| 8,528,798 B2 * | 9/2013 | Chen | A45C 3/001 |
| | | | 224/217 |
| 10,239,665 B2 * | 3/2019 | Molineux | B65D 33/00 |
| 10,270,484 B2 * | 4/2019 | Lambert | A61L 2/26 |
| 10,816,124 B2 * | 10/2020 | Molineux | F16L 57/06 |
| 2003/0012371 A1 | 1/2003 | Weinstock et al. | |
| 2005/0186911 A1 | 8/2005 | Chen | |
| 2009/0238851 A1 | 9/2009 | Huang | |
| 2013/0004747 A1 | 1/2013 | Schwarz et al. | |

OTHER PUBLICATIONS

Techcrunch.com, Proporta Antimicrobial Case, http://techcrunch.com/2010/01/12/proporta-antimicrobial-case-protects-your . . . , printed Nov. 2, 2011, date of publication date unknown, pp. 1-3 of 4.

PureZing.com, Harmful Ingredients in Household Cleaning Products, w w w .purezing.com/living/toxins/living_toxins_harmfulhousehold.html, printed Oct. 16, 2012, date of publication date unknown, 2 pages.

Nanos Nano Technology, How silver nanoparticles kill bacteria, www.snanos.co.th/index.php/how-silver-nanoparticles-kill-bacteria.html, printed Oct. 16, 2012, date of publication date unknown, 1 page.

Dr. Daniel N. Tagoe, Bacterial Contamination of Mobile Phones: When Your Mobile Phone Could Transmit More Than Just a Call, www.webmedcentral.com/article_view/2294, printed Oct. 16, 2012, published Oct. 5, 2011, 4 pages.

Tom King, How Does UV Light Kill Bacteria, eHow, www.ehow.com/how-does_5188035_uv-light-kill-bacteria_.html, printed Mar. 5, 2013, date of publication date unknown, 3 pages.

NancySilver.com, Corrosion Intercept Anti-tarnish Fabric Pouch 3.5" x 4.5", http://www.google.com/imgres?imgurl=http://www.nancysilver.com/mm5/graphics/0000 . . . , printed Nov. 15, 2011, date of publication date unknown, 1 page.

Fergus Walsh, Now Wash your hands- and your mobile, BBC News, http://www.bbc.co.uk/news/mobile/health-15284501?SThisEM, printed May 29, 2012, date of publication unknown, pp. 1 of 3, 2 of 3.

Jane Hughes, Mobile Phones: 'Still no evidence of harm to health', BBC News, http://www.bbc.co.uk/news/health-17843953, printed May 29, 2012, date of publication unknown, pp. 1 of 3, 2 of 3.

Nature of UV Radiation, source and date printed unknown, date of publication unknown, 6 pages.

Brian Dowling, Hospital Acquired Infections, The Human and Financial Costs, Vital Signs, Inc., print date unknown, date of publication unknown, 4 pages.

Hospital Acquired Infections, A Compendium of Information Regarding Hospital Acquired Infections and How to Fight Them at Their Source, PHC4 Research Brief, Issue No. 8, Nov. 2005, date and location of publication unknown, 6 pages.

Carolina Silver Brand, http://www.carolina-silver.com/index.php?option=com_content&view=article&id=3&Item . . . , printed Nov. 2, 2011, date of publication unknown, 1 page.

Carolina Silver Brand, News from Carolina Silver, http://www.carolina-silver.com/index.php?option=com_content&view=article&id=5&Item . . . , printed Nov. 2, 2011, date of publication unknown, 1 page.

Carolina Silver Brand, Permanently Bonded Silver Yarns, http://www.carolina-silver.com/index.php?option=com_content&view=article&id=9&Item . . . , printed Nov. 2, 2011, date of publication unknown, 1 page.

Celia M Witten Ph.D, M.D., Antimicrobial Barrier Wound Contact Dressing, Department of Health & Human Services Letter, date of publication unknown, 5 pages.

Author Unknown, Hospital-acquired infection, Wikipedia, http://en.wikipedia.org/wiki/Hospital_Acquired_Infections, printed May 22, 2013, date of publication unknown, 7 pages.

Mohler, F.L., Experiments on the emission and absorption of radiation by metallic silver, Abstract, NIST Journal of Research, http://nsitdigitalarchives.contentdm.oclc.org/cdm/compoundobject/collection/p13011coll6/id/141743/rec/8, printed Jan. 24, 2013, published Mar. 1932, 2 pages, National Bureau of Standards.

Author Unknown, How to Clean a Dirty Cell Phone, Buzzle.com, http://buzzle.com/articles/how-to-clean-a-dirty-cell-phone.html, printed Nov. 29, 2011, date of publication unknown, pp. 1 of 4, 2 of 4.

Knox, Richard, Scientists Bag Small Game in Bathroom Germ Safari, http://www.npr.org/blogs/health/2011/11/23/142720314/scientists-bag-small-game-in-bathroom-germ-safari, printed Nov. 29, 2011, published Nov. 29, 2011, 2 pages.

Casey, Tina, Cotton, Silver and Electricity can Kill Bacteria in Water, http://cleantechnica.com/2010/10/15/cotton-silver-and-electricity-can-kill-bacteria-in-water/, printed Dec. 19, 2011, date of publication unknown, pp. 2-4 of 11.

McCaughey, Betsy, Coming Clean, http://www.hospitalinfection.org/press/060505ny_times.htm, published Jun. 6, 2005, printed Mar. 2, 2006, 3 pages.

Author Unknown, Silver—Nature's Water Purifier, http://www.doulton.ca/silver.html, printed Dec. 19, 2011, date of publication unknown, 6 pages.

Author Unknown, Killing Germs in Hospitals, Air Ducts with Silver-Based Coating Stay Germ-Free, http://www.sciencedaily.com/videos/2005/0910-killing_germs.htm, printed Dec. 19, 2011, published Sep. 1, 2005, pp. 1-2 of 3.

Robert Glatter, MD, Can Your Smartphone Spread the Flu?, Forbes, http://www.forbes.com/sites/robertglatter/2013/01/24/can-your-smartphone-spread-the-flu/ printed May 23, 2013, Published Jan. 24, 2013, 4 pages.

Author Unknown, Foss Manufacturing to Be Featured on 21st Century Business Television Series May 12, 2012, http://www.fosshield.com/press/, printed Aug. 26, 2013, published May 11, 2012, pp. 3-4 of 4.

Author Unknown, Keeping it clean: Xentris wireless introduces high gloss mobile phone covers with Fosshield antimicrobial technology, source and date of publication unknown, 2 pages.

Author Unknown, Infection Control Market—Global Forecast to 2017—New Market Report, http://www.sbwire.com/press-releases/infection-control-market-global-forecast-to-2017-new-market-report-250130.htm, printed Jul. 2, 2013, published May 18, 2013, 2 pages.

Martin, Jerold, Understanding Gamma Sterilization, http://www.biopharminternational.com/biopharm/article/articleDetail.jsp?id=757930, printed Aug. 27, 2013, published Feb. 1, 2012, 4 pages.

Author Unknown, Dangerous Bacteria Found on Patients' Cell Phones, http://www.infectioncontroltoday.com/news/2011/05/dangerous-bacteria-found-on-patients-cell-phones.aspx, printed Jun. 19, 2013, published May 31, 2011, pp. 1 of 2, 2 of 2, and 1 of 1.

Author Unknown, Mobile Phone is a Hygiene Risk, Study Says, http://www.infectioncontroltoday.com/news/2010/08/mobile-phone-is-a-hygiene-risk-study-says.aspx, printed Jun. 19, 2013, published Aug. 20, 2010, 2 pages.

Silver & Bacteria, CuddleSmart.com, http://www.cuddlesmart.com/learn, printed Aug. 26, 2013, 2 pages.

Paulson, Daryl S., Persistent and Residual Antimicrobial Effects: Are They Important in the Clinical Setting?, http://www.

(56) References Cited

OTHER PUBLICATIONS infectioncontroltoday.com/articles/2005/04/persistent-and-residual-antimicrobial-effects-are.aspx, printed Aug. 26, 2013, published Apr. 1, 2005, 3 pages.
The Levi's® Brand Introduces 511®; Skinny Jeans and Trucker Jacket for Commuter Cyclists, http://store.levi.com/emails/, printed May 21, 2012, published Apr. 11, 2011, 2 pages.
HAI 101, http://www.infectionpreventiontextiles.com/HAI-101.php printed May 10, 2012, 1 page.
What's being done to prevent HAIs?, http://www.infectionpreventiontextiles.com/Infection-Prevention.php, printed May 10, 2012, 1 page.
A closer look at environmental contaminants, http://www.infectionpreventiontextiles.com/Environmental-Contamination.php printed May 10, 2012, 2 pages.
Bacterial Management of Soft Surfaces, http://www.infectionpreventiontextiles.com/Bacterial-Management-of-Soft-Surfaces.php printed May 10, 2012, 2 pages.
Author Unknown, X-Static® Blog, http://www.infectionpreventiontextiles.com/blog/, printed May 10, 2012, pp. 5-7 of 7.
Author Unknown, X-Static® Antimicrobial Technology Supports International Infection Prevention Week, http://www.noblebiomaterials.com/pinewsarticles_www.asp?itemid=333&submit=getrecord&recordid=91, printed Aug. 19, 2013, published Oct. 17, 2012, 2 pages.
Author Unknown, X-Static® Technology featured in Healthcare Purchasing News, http://www.noblebiomaterials.com/pinewsarticles_www.asp?itemid=333&submit=getrecord&recordid=90, printed Aug. 19, 2013, published Sep. 21, 2012, 1 page.
Cantrell, Susan, Shifting to offense from defense, http://www.hpnonline.com/inside/2012-09/1209-ip-environmental.html, printed Aug. 19, 2013, published Sep. 2012, 9 pages.
Author Unknown, X-Static® Antimicrobial Technology Featured in Critical Care Nurse, http://www.noblebiomaterials.com/pinewsarticles_www.asp?itemid=333&submit=getrecord&recordid=90, printed Aug. 19, 2013, published Sep. 19, 2012, 1 page.
Author Unknown, New Study on Soft Surface Bacterial Contamination, http://www.noblebiomaterials.com/pinewsarticles_www.asp?itemid=333&submit=getrecord&recordid=88, printed Aug. 19, 2013, published Sep. 7, 2012, 1 page.
Author Unknown, X-Static® Antimicrobial Technology Releases Whitepaper on Infection Prevention for Soft Surface Fabrics, http://www.noblebiomaterials.com/pinewsarticles_www.asp?itemid=333&submit=getrecord&recordid=87, printed Aug. 19, 2013, published Aug. 9, 2012, p. 1 of 2.
Author Unknown, X-Static® Silver Antimicrobial Technology Provides Infection Benefits for Healthcare, http://www.noblebiomaterials.com/pinewsarticles_www.asp?itemid=333&submit=getrecord&recordid=78, printed Aug. 19, 2013, published Feb. 28, 2012, p. 1 of 2.
Author Unknown, X-Static® technology featured in the December issue of Emergency Medicine News, http://www.noblebiomaterials.com/pinewsarticles_www.asp?itemid=333&submit=getrecord&recordid=80, printed Aug. 19, 2013, published Dec. 6, 2011, 1 page.
X-Static® (regulated by the FDA), http://www.noblebiomaterials.com/category.asp?itemid=367, printed Aug. 19, 2013, 1 page.
Healthcare & Medical, Noble Biomaterials, http://www.noblebiomaterials.com/category.asp?itemid=61, printed Aug. 19, 2013, 1 page.
Infection Prevention, Noble Biomaterials, http://www.noblebiomaterials.com/category.asp?itemid=372, printed Aug. 19, 2013, 1 page.
Bacterial Management for Apparel & Textiles (regulated by the EPA), Noble Biomaterials, http://www.noblebiomaterials.com/category.asp?itemid=370, printed Aug. 19, 2013, 1 page.
FreshAG™—Where the Freshness and Comfort are Built-In, Noble Biomaterials, http://www.noblebiomaterials.com/category.asp?itemid=381, printed Aug. 19, 2013, p. 1 of 2.
Dyeable Odor and Bacteria Protection Technology, Noble Biomaterials, http://www.noblebiomaterials.com/category.asp?itemid=380, printed Aug. 19, 2013, p. 1 of 2.
X-Static® MVT + Antimicrobial Maximizes Membrane Performance, Noble Biomaterials, http://www.noblebiomaterials.com/category.asp?itemid=382, printed Aug. 19, 2013, 2 pages.
Performance to the Power of X, Noble Biomaterials, http://www.noblebiomaterials.com/category.asp?itemid=52, printed Aug. 19, 2013, 2 pages.
ContaX®, Noble Biomaterials, http://www.noblebiomaterials.com/category.asp?itemid=53, printed Aug. 19, 2013, 2 pages.
CircuiteX™, Noble Biomaterials, http://www.noblebiomaterials.com/page.asp?itemid=138, printed Aug. 19, 2013, p. 1 of 2.
Electronics, Noble Biomaterials, http://www.noblebiomaterials.com/category2.asp?itemid=144, printed Aug. 19, 2013, 1 page.
Cables & Wires, Noble Biomaterials, http://www.noblebiomaterials.com/category2.asp?itemid=214, printed Aug. 19, 2013, 1 page.
Flexible Circuitry, Noble Biomaterials, http://www.noblebiomaterials.com/category2.asp?itemid=216, printed Aug. 19, 2013, 1 page.
Personal Electronics, Noble Biomaterials, http://www.noblebiomaterials.com/category2.asp?itemid=218, printed Aug. 19, 2013, 1 page.
Body Monitoring, Noble Biomaterials, http://www.noblebiomaterials.com/category2.asp?itemid=213, printed Aug. 19, 2013, 1 page.
EMI/RF Shielding, Noble Biomaterials, http://www.noblebiomaterials.com/category2.asp?itemid=215, printed Aug. 19, 2013, 1 page.
Heated Fabrics, Noble Biomaterials, http://www.noblebiomaterials.com/category2.asp?itemid=217, printed Aug. 19, 2013, 1 page.
Static Management, Noble Biomaterials, http://www.noblebiomaterials.com/category2.asp?itemid=208, printed Aug. 19, 2013, 1 page.
Athletic, Noble Biomaterials, http://www.noblebiomaterials.com/page.asp?itemid=179, printed Aug. 19, 2013, 1 page.
Apparel & Textiles, Noble Biomaterials, http://www.noblebiomaterials.com/category2.asp?itemid=60, printed Aug. 19, 2013, 1 page.
Protective Gear, Noble Biomaterials, http://www.noblebiomaterials.com/page.asp?itemid=184, printed Aug. 19, 2013, 1 page.
Hoisery, Noble Biomaterials, http://www.noblebiomaterials.com/page.asp?itemid=180, printed Aug. 19, 2013, 1 page.
Military & Government Services, Noble Biomaterials, http://www.noblebiomaterials.com/category2.asp?itemid=58, printed Aug. 19, 2013, 1 page.
Regulatory, Noble Biomaterials, http://www.noblebiomaterials.com/category2.asp?itemid=175, printed Aug. 19, 2013, 1 page.
Author Unknown, X-Static® Antimicrobial Technology Featured in the June Issue of Infection Control Today, http://www.noblebiomaterials.com/pinewsarticles_www.asp?itemid=333&submit=getrecord&recordid=99, printed Aug. 19, 2013, published Jul. 3, 2013, 1 page.
Author Unknown, National Patient Safety Week Focus: Soft Surface Bacterial Management, http://www.noblebiomaterials.com/pinewsarticles_www.asp?itemid=333&submit=getrecord&recordid=95, printed Aug. 19, 2013, published Mar. 15, 2013, 1 page.
Author Unknown, X-Static® Announces Webinar on Soft Surface Bacterial Management Available for CE Credit, http://www.noblebiomaterials.com/pinewsarticles_www.asp?itemid=333&submit=getrecord&recordid=94, printed Aug. 19, 2013, published Mar. 6, 2013, 1 page.
Luebbert, Peggy Prinz, A More Complete Approach to Infection Prevention, Infection Control Today Webinar, http://www.infectioncontroltoday.com/webinars/2013/02/Complete-Approach-Infection-Prevention.aspx, printed Aug. 19, 2013, posted Feb. 27, 2013.
Author Unknown, Infinitude Clothing™ Partners with X-STATIC® Antimicrobial Technology to Add Infection Prevention Benefits to Its Fashion-Forward Apparel Line, http://www.noblebiomaterials.com . . . , printed Aug. 19, 2013, published Dec. 27, 2012, 2 pages.
Luebbert, Peggy Prinz, Incorporating Soft Surface Fabrics in the IP Bundle: 6 Considerations for Complete Environmental Disinfection, http://www.beckersasc.com, printed Aug. 19, 2013, published Oct. 18, 2012, 3 pages.
Beggs, Clive, et al., Increasing the frequency of hand washing by healthcare workers does not lead to commensurate reductions in

(56) References Cited

OTHER PUBLICATIONS staphylococcal infection in a hospital ward, http://www.biomedcentral.com/1471-2334/8/114, printed Feb. 14, 2012, published Sep. 2, 2008, 9 pages.
Melnick, Meredith, Thought Bed Bugs Were Bad? Try Bed Bugs With MRSA, http://www.healthland.time.com/2011/05/12/thought-bed-bugs-were-bad-try-bed-bugs-with-mrsa/, printed May 12, 2011, published May 12, 2011, 2 pages.
Pollack, Andrew, Rising Threat of Infections Unfazed by Antibiotics, The New York Times, web address unknown, date printed unknown, published Feb. 26, 2010, 3 pages.
Pollack, Andrew, Deadly Germs Largely Ignored by Drug Firms, The New York Times, web address unknown, date printed unknown, published Feb. 26, 2010, 2 pages.
Tutton, Mark, Disinfectants could give rise to antibiotic-resistant superbugs, CNN Health, web address unknown, date printed unknown, published Dec. 30, 2009, 2 pages.
Author Unknown, 80% of Doctors Use Smartphones and Medical Apps in Everyday Medical Practice, http://www.prweb.com/releases/2011/10/prweb8846867.htm, printed Jun. 29, 2012, published Oct. 3, 2011, 2 pages.
Author Unknown, How Silver Kills Bacteria, http://www.wellnessresources.com/studies/entry/how_silver_kills_bacteria, printed Aug. 19, 2013, date of publication unknown, 2 pages.
Feng, Q.L. et al., A mechanistic study of the antibacterial effect of silver ions on *Escherichia coli* and *Staphylococcus aureus*, Source unknown, published Mar. 9, 2000, pp. 662-668.
Zhang, Xiao-Yang et al., Controllable plasmonic antennas with ultra narrow bandwidth based on silver nano-flags, abstract from http://apl.aip.org/resource/1/applab/v101/i15/p153118_s1?isAuthorized=no, Published Online Oct. 12, 2012, vol. 101, Issue 15, printed Aug. 19, 2013, 2 pages.
Boyce, Tammy, MRSA 'more complex than cleaning', http://news.bbc.co.uk/2/hi/health/7772871.stm, printed Aug. 12, 2013, date of publication unknown, 3 pages.
Chi, Ting et al., Market Segmentation and Growth Opportunities for Medical Textiles & Health-Care Products, Source unknown, date of publication unknown, California State Polytechnic University at Pomona, 14 pages.
Antimicrobial is Best, http://www.fosshield.com/technology/antimicrobial-antibacterial/, printed Aug. 26, 2013, 2 pages.
Palomo, Joseph, Face Masks for Today's Challenges, Source unknown, date of publication unknown, Cardinal Health, 6 pages.
Edwards, J. Vincent et al., Prevention and Treatment of Decubitus Pressure Ulcers, PowerPoint Presentation, Source unknown, date of publication unknown, 11 pages.
Edwards, J. Vincent et al., Prevention and Treatment of Decubitus Pressure Ulcers, Source unknown, date of publication unknown, 17 pages.
Bruer, Shanna M. et al., Three-Dimensionally Knit Spacer Fabrics: A Review of Production Techniques and Applications, Journal of Textile and Apparel, Technology, and Management, Summer 2005, vol. 4, Issue 4, 31 pages, North Carolina State University.
Al-Kaheel, Abduldaem, 150 Kinds of germs on the hand palm, Secrets of Quran Miracles, http://kaheel7.com/eng/index.php/health-a-medicine/387-150-kinds-of-germs-on-the-hand-palm, printed Jan. 27, 2012, date of publication unknown, 4 pages.
X-Bac Plus Ensures clean & safe mobile phone conversations, Nano Silver Manufacturing, source unknown, date of publication unknown, date printed unknown, 1 page.
Josh Goldstein, Hospital Infections Targeted, The Philadelphia Inquirer, date of publication unknown, 2 pages.
Author Unknown, Nature of UV Radiation, Source and date of publication unknown, 6 pages.
Efficacy, http://www.silverquine.com/efficacy#.UhLU_UbSjoA, printed Aug. 19, 2013, 2 pages.
How Many Germs Live on Your Cell Phone, Quiz—The Oatmeal, http://theoatmeal.com/quiz/phone_germs, printed Aug. 19, 2013, date of publication unknown, pp. 1-4 of 5.
How Many Germs Live on Your Cell Phone, Quiz—The Oatmeal, http://theoatmeal.com/quiz/phone_germs/go, printed Aug. 19, 2013, date of publication unknown, p. 1 of 2.
Power Stretch 5 Finger Liner, Unisex, http://www.freehands.com/products/Power-Stretch-5-Finger-Liner%2C-Unisex.html, printed May 1, 2012, 1 page.
Silver combats germs from antiquity to the present, http://www.active-silver.com/index.php?id=233, printed Aug. 19, 2013, 1 page.
Use next to the skin, http://www.active-silver.com/index.php?id=4, printed Aug. 19, 2013, 1 page.
For soft furnishings, commercial textiles or fillings, http://www.active-silver.com/index.php?id=11&L=0, printed Aug. 19, 2013, 1 page.
Active>silver™—The advantages at a glance, http://www.active-silver.com/index.php?id=230, printed May 21, 2012, 1 page.
Textiles containing silver, http://www.active-silver.com/index.php?id=231, printed May 21, 2012, 1 page.
Fox, Zoe, 16% of Cellphones Have Poop on Them, Mashable Infographic, http://mashable.com/2011/11/09/tech-germs/, printed May 16, 2013, published Nov. 9, 2011, pp. 2-5 of 10.
Friedman, Bruce, Improving Quality of Care Justifying the cost for a single patient use blood pressure cuff, GE Healthcare, source unknown, date of publication unknown, 9 pages.
Antimicrobial AlphaSan®, http://millikenchemical.com/pages/products/alphasan/default.aspx, printed Aug. 19, 2013, 1 page.
Author Unknown, Healthcare Associated Infections: The Unknown Killer, http://visualization.geblogs.com/visualization.hais/, printed May 10, 2012, 1 page.
EMF Shielding & Conductive Fabrics, LessEMF.com, http://www.lessemf.com/fabric.html#1220, printed Aug. 26, 2013, date of publication unknown, 29 pages.
Gott, Dr. Peter, Superbugs attack health facilities, The Royal Gazette, published Apr. 26, 2011, 2 pages.
Tanner, Lindsey, Study: Decontaminating patients cuts hospital infections, Associated Press for the Times, published May 30, 2013, 1 page.
Author Unknown, Nanotechnology Shock Waves, The New York Times, published May 6, 2012, 1 page.
Author Unknown, Practical experience versus laboratory test methods, The Rudolf Group, http://www.rudolf.de/brands/en/silverplus/test-methods.htm, printed May 21, 2012, date of publication unknown, pp. 1-4 of 7, 6-7 of 7.
Argent 47 Silver Embedding Process, http://www.argent47.com/t-embedding.aspx, printed Aug. 12, 2013, 1 page.
Author Unknown, Antimicrobial Overkill, http://www.ecobabysteps.com/2011/02/11/antimicrobial-overkill/, printed Mar. 30, 2011, published Feb. 11, 2011, 2 pages.
Duncan, Elaine, Navigating Standards & Regulations for Medical Textiles, PowerPoint Presentation for IFAI Medical Textiles Symposium, Oct. 31, 2006, 10 pages.
Maternity Clothing, Anti-Radiation, http://www.mamiclothing.com/WhyMamiClothing.aspx, printed Aug. 29, 2013, 2 pages.
Antimicrobials in Plastic Applications, Intertech-Pira conference, date of publication unknown, source unknown, 6 pages.
FresherLonger Miracle Food Storage, advertisement, source unknown, date of publication unknown, 1 page.
MicroSilverWear™ Research, Clinical studies synopsis, source unknown, date of publication unknown, 1 page.
Monster CleanTouch Pen for Portable Electronics Screens—Cleaning Kit, http://www.google.com/products/catalog?q=monster+clean+touch+. . . , printed May 1, 2012, p. 1.
Z Bact Silver Ionic Towel, source unknown, date of publication unknown, 1 page.
Author Unknown, Food, Hands, and Bacteria, University of Georgia College of Agricultural and Environmental Sciences, source unknown, date of publication unknown, 8 pages.
Z-Bact Silver Ionic Towel, source unknown, 3 pages.
Products, http://www.noblebiomaterials.com/category2.asp?itemid=120, printed Aug. 19, 2013, 1 page.
Device Captures Ambient Electromagnetic Energy to Drive Small Electronic Devices, Bluelight, http://www.bluelight.ru/vb/archive/index.php/t-582260.html?s=bf2dbaaf4f6fa053525d38706c5c3381, printed Aug. 19, 2013, 4 pages.

(56) References Cited

OTHER PUBLICATIONS

Manufacturing Solutions Center, Antimicrobial Testing, L-A-B Accredited ISO/IEC 17025 Certificate # L2238 Testing, Assessment of Antibacterial Finishes on Textile Materials, Dimensional Changes of Fabrics after Home Laundering, from www.argent47.com, pp. 3-4 of 4.

Manufacturing Solutions Center, Antimicrobial Testing: L-A-B Accredited ISO/IEC 17025 Certificate # L2238 Testing, Determining Antimicrobial Activity of Immobilized Antimicrobial Agents, from www.argent47.com, 2 pages.

Instituo Tecnico Industriale Statale "q. Sella", Test results, www.argent47.com/INTERNATIONAL_TESTING.pdf, 15 pages.

Alanis, AJ, Resistance to antibiotics: are we in the post-antibiotic era?, http://www.ncbi.nlm.nih.gov/pubmed/16216651, publication date unknown, printed May 26, 2013, p. 1 of 2.

Unknown Author, The Cost of Infection Preventing Infections Makes Hospitals More Profitable, http://www.hospitalinfection.org/cost_of_infection.shtml, publication date unknown, printed May 21, 2013, pp. 1-2 of 4.

Unknown Author, Copper Touch Surfaces, http://www.coppertouchsurfaces.org/antimicrobial/index.html, publication date unknown, printed May 29, 2013, 2 pages.

Author Unknown, Dirty Talk: What's Really on Your Cell Phone?, http://www.ktla.com/news/extras/ktla-cellphone-bacteria,0,390060.story, printed Nov. 18, 2011, date of publication unknown, pp. 1-2 of 3.

Author Unknown, X-Static® Silver Antimicrobial Technology Provides Infection Prevention Benefits for Healthcare, X-Static® Blog, http://www.infectionpreventiontextiles.com/blog/, printed May 10, 2012, published Feb. 28, 2012, p. 1 of 7.

Antenna Systems, Noble Biomaterials, http://www.noblebiomaterials.com/category2.asp?itemid=212, printed Aug. 19, 2013, 1 page.

Ives, Herbert E., et al., The Photoelectric Effect from Thin Films of Alkali Metal on Silver, abstract from http://www.prola.aps.org/abstract/PR/v38/i8/p1477_1, printed Jul. 30, 2012, published Oct. 1931, 2 pages.

Adams, Mike, Antibacterial silver products finally begin to emerge after years of FDA oppression, http://www.naturalnews.com/010761.html, printed Dec. 19, 2011, published Aug. 7, 2005, pp. 1-4.

X-Static—The Silver Fiber, http://www.infectionpreventiontextiles.com, printed Aug. 19, 2013, 3 pages.

Hartocollis, Anemona, With Money at Risk, Hospitals Push Staff to Wash Hands, http://www.nytimes.com/2013/05/29/nyregion/hospitals-struggle-to-get . . . , printed Nov. 5, 2011, published May 28, 2013, 3 pages.

\* cited by examiner

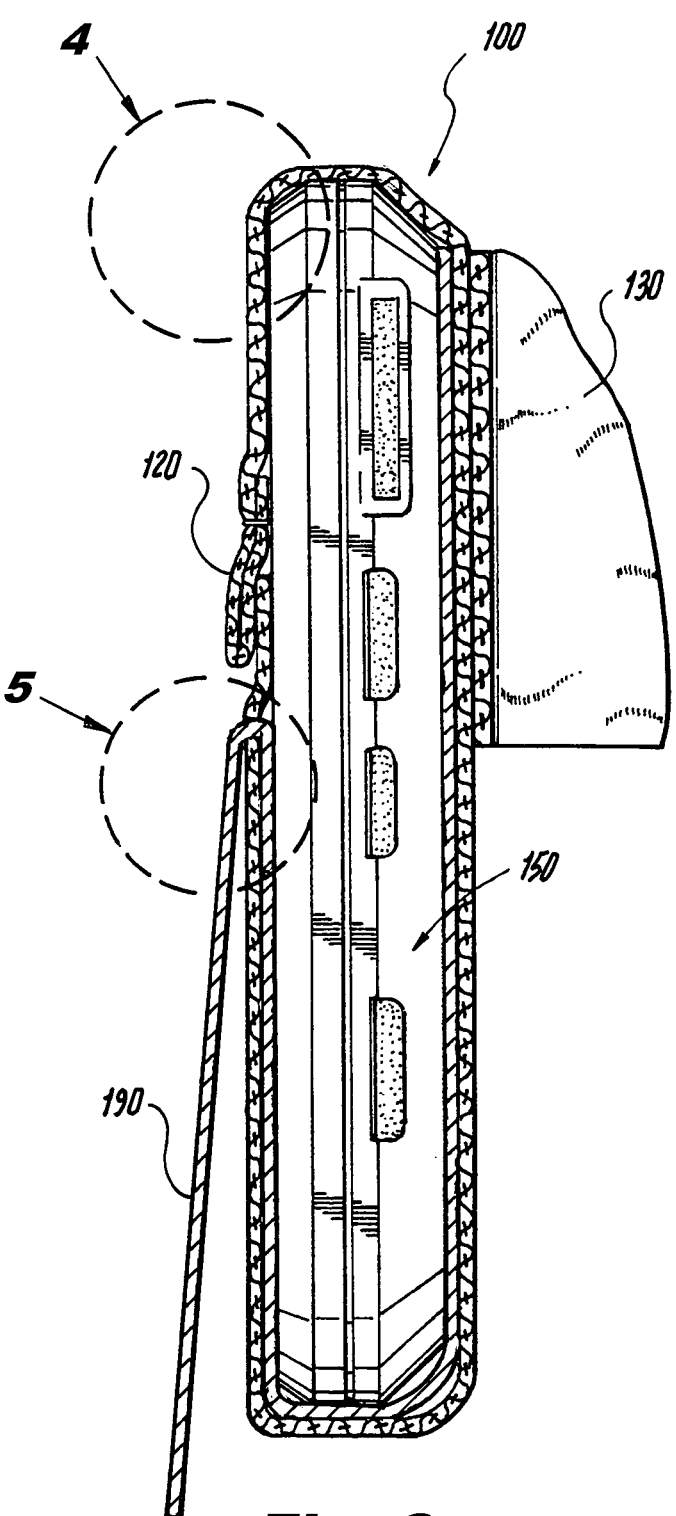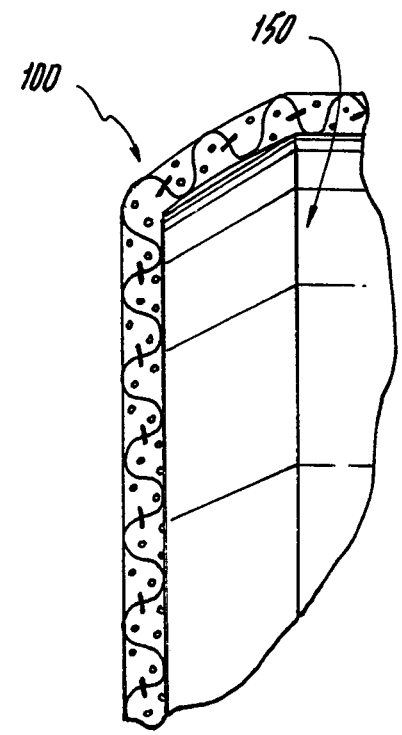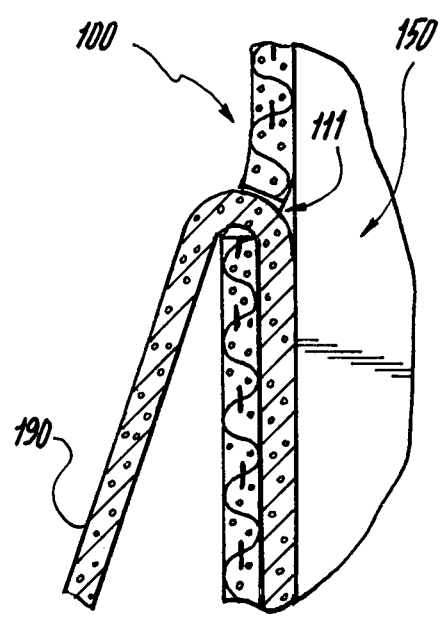
Fig. 3
Fig. 4
Fig. 5

SANITIZING POUCH FOR ELECTRONICS

CROSS REFERENCE TO RELATED APPLICATIONS

The present application is a continuation application under 35 U.S.C. § 120 of U.S. application Ser. No. 16/213,699, filed on May 31, 2013 which is a divisional application under 35 U.S.C. § 121 of U.S. application Ser. No. 13/906,668, filed on May 31, 2013, now U.S. Pat. No. 10,239,665, the disclosure of each of which is hereby incorporated by reference in their entirety.

FIELD OF THE INVENTION

The present invention relates generally to a biomedical reusable anti-static fabric pouch for amplifying electromagnetic wifi signals, storing, transporting and sanitizing electronic devices. The present invention also relates to covers, pouches, and cases for handheld electronic devices such as cellular phones, media players (e.g., mp3, mp4, etc.), PDAs, E-readers, laptop computers, tablets, walkie talkies, and other such devices including adult sex toys. The structure relates to a 24-hour protective barrier to eliminate the variables and spread of bacterial, viral and fungus infections in the most commonly, and uncommonly used areas of the users device. The present invention further relates to a molecularly bonded, anti-static, silver fiber impregnated yarn fabricated into an open planar configuration (e.g., knitted, woven and a non-woven cleaning pad fabric), incorporated into apparel and devices used to sanitize electronics and non-electronic devices, including surgical apparel (e.g., scrubs), pants, top, and, pockets and pocket lining. The invention further relates to a device that acts to minimize the radiation emitted from the device and absorbed into the body.

BACKGROUND OF THE INVENTION

Personal electronic devices, including cellular phones, media players (e.g., mp3, mp4, etc.), PDAs, E-readers, laptop computers, notebook computers, tablets, walkie talkies, Bluetooth, WIFI accessories and other such devices, including massagers and sometimes even adult sex toys (collectively referred to herein as "Electronic Devices") are ubiquitous. A recent study has shown that approximately 85% of American adults have cellular phones, 61% have laptop computers, 18% have E-readers and 18% have tablets. Joanna Brenner, *Pew Internet Mobile, Pew Internet: Mobile* (Oct. 16, 2012), http://pewinternet.org/Commentary/2012/February/Pew-Internet-Mobile.aspx. In addition, a significant percentage of children have Electronic Devices, including their own cell phones, computers and/or ipads/tablets. Some Electronic Devices, such as cell phones (including smart phones) and tablets (e.g., ipads) are used on a daily basis in classrooms and handled by multiple users. Doctors, nurses and the Healthcare providers carry these devices almost everywhere they go. Hand sanitization is only effective until recontamination occurs, which happens immediately upon touching a contaminated surface. Indeed, the technology used for Electronic Devices and the data programs designed by telecommunications companies promote the portability and multitasking capability of these Electronic Devices everywhere and anywhere.

There are 6,600 hospitals, 65,000 assisted living facilities just in the United States employing over 10 million people, including 2 million nurses, 650,000 doctors.

Electronic Devices are almost always hand operated, requiring the user to touch buttons and screens with their hand(s) and fingers. Consequently, contaminants present on the user's hand(s), including dirt, debris, gram-negative bacteria, germs, fungus, viruses and other pathogenic microorganisms transfer onto the Electronic Devices. Without proper cleaning, the hand hygiene for each and every user of a particular Electronic Device is directly related to the health and well being of all people that come in contact with the Electronic Devices and other items those people handle and touch. Cross-contamination through such Electronic Devices is common and is a problem. The Electronic Device acts as a fomit or vehicle by transferring gram-negative bacteria, fungus and viruses from one person to another. In hospitals and medical facilities the #1 protocol fighting Hospital Acquired infections (HAI's) is hand washing, or as it is more clinically known in the hospital industry, hand-hygiene. Hand washing is only effective until recontamination occurs, which happens immediately upon touching a contaminated surface. Researchers suggest one in six mobile phones is contaminated with fecal matter.

There is a panoply of efforts to promote a basic tenet of infection prevention. With drug-resistant superbugs on the rise, according to a recent report by the federal Centers for Disease Control and Prevention, and with hospital acquired infections costing $30 billion and leading to nearly 100,000 patient deaths a year hospitals are willing to try almost anything to reduce the risk of transmissions. The New York Times; Wednesday, May 29, 2013.

Most people carry Electronic Devices wherever they travel and use the devices while simultaneously performing other tasks, including eating, working, and even while using the lavatory. It is not uncommon for people to drop the Electronic Devices on the ground or to place them on a unwashed table or counter at home or in a pubic place, resulting in the device(s) coming into contact with contaminates, such as gram-negative bacteria, viruses, and fungi, on those surfaces, Contamination and cross-contamination of Electronic Devices is of particular concern in and around medical facilities, such as hospitals, where patients, staff, and practitioners wash there bands and cross-contaminate when they carry the Electronic Devices into exam rooms, operating, rooms, quarantined areas, where patients having a suppressed and compromised immune systems are highly susceptible and potentially life threatening.

The Electronic Devices are used while a person is there and while the person may wash his/her hands upon leaving, the Electronics Devices remains contaminated Indeed, in order for hospitals to maintain "terminal" cleaning regimens for the daily use of such electronic devices (that being said "cell phone" and "PDAs") within the hospital is paramount. Such devices not being one time use or disposable, should be disinfected and maintained after each and every use to eliminate a variable of infection. An obvious conclusion is these devices are a leading fomit or route to pass pathogens between patients. Hospital acquired infected patients in the U.S. are estimated by the CDC (Centers for Disease Control and Prevention, CDC) to be in the millions. *Wikipedia*, Hospital-acquired infection, wikipedia.org, May 2013. The average additional hospital cost when a patient contracts an infection is $15,275. Estimated 2,000,000 infections per year equates to $30.5 Billion dollars. The flu virus can survive on surfaces from 2-8 hours, according to the CDC. And MRSA, (a staph bacteria resistant to common antibiotics) can be present and viable on surfaces from up to 8-9 days based on studies. Forbes; Pharma & Healthcare Jan. 24, 2013.

Recent studies about bacterial colonization and biofilms on the surface of cellular phones have shown that numerous gram-negative bacteria cultures are commonly found on most cellular phone devices including *Klebsiella pneumonia, Citrobacter* spp., *Staphylococcus aureus*, Coagulase Negative Staphylococci (CNS), *Pseudomonas aeruginosa, Salmonella* spp., MRSA, *Proteus mirabilis, Escherichia coli, Bacillus cereus, Streptococcus pneumonia, Salmonella* spp. and *Shigella* spp. These contaminants are known to exist on exposed surfaces up to 8-9 days per the CDC studies (Forbes; Pharma & Healthcare Jan. 24, 2013) as well as within a device's crevices (e.g., between panels, keys, buttons, etc.). Exposure to such bacteria can lead to the spread of bacterial, viral and fungi infections and can be fatal in some people with certain underlying health conditions as a suppressed or compromised immune system, e.g., babies and elderly, who are most susceptible. A continuous-time process to proper sanitization of routinely used electrical device is crucial.

Several attempts have been made to overcome the problems associated with the contamination of Electronic Devices. Some users are pro-active and use household cleaners on the Electronic Devices, but the majority are reactive and use antibiotics to eliminate their reoccurring infections. The indiscriminate and inappropriate use of antibiotics in outpatient clinics, hospitalized patients, and in the food industry, is the single largest factor leading to antibiotic resistance posing a risk to post-antibiotic resistance.

One major problem with household cleaners and antibiotics is it creates the potential for microbes like the superbug MRSA to become antibiotic resistant stated by the CDC (Centers for Disease and Prevention). In addition, they often contain chemicals that are non-compatible and harmful to electronics and in some instances, to people also. Household cleaners leave residues behind containing traces of cleaning agents such as ammonia and bleach and in some instances other more abrasive and harmful chemicals. After cleaning, when the user begins to handle the device, the chemicals left on the Electronic Devices transfer onto the user's hands and fingers and other parts of their body that they touch with the device, e.g., face and ears, or other parts of their body, oftentimes causing irritation to the skin, eyes and ears. Also, if the user is not careful when cleaning Electronic Devices using a non-approved cleaner in liquid form, the liquids could come into contact with and damage the delicate circuitry that exists within the device. Using detergents and cleaning agents can also be time consuming, and cumbersome, particularly when a user needs to clean several different pieces of Electronic Devices, preferably on a regular and recurring basis.

Sanitizing wipes are also used to clean Electronic Devices. Sanitizing wipes are typically saturated with an alcohol-based solution that acts to kill bacteria as the wipe is pressed over surfaces. Sanitizing wipes are often disposable and because the alcohol-cleaning agent evaporates once exposed to the air, they can only be used once before having to be discarded. Accordingly, users must constantly purchase additional disposable wipes to clean their Electronic Devices, which can be costly and not practical. In hospitals, in order to maintain compliance, the Electronic Device would have to be wiped down after each and every use. The chemicals used in sanitizing wipes may also be harmful to Electronic Devices, both the electrical components inside and the outside surfaces and coatings of the Electronics Device. The repeated exposure of a device's plastic and other synthetic components to certain cleaning agents may cause discoloration and deterioration. Using wipes to clean Electronic Devices also requires the individual to periodically replenish disposable products.

Another method of sanitizing Electronic Devices includes exposure to Ultraviolet germicidal irradiation (UV) light. UV light has been shown to kill microorganisms by damaging their DNA. The Ultraviolet Germicidal Irradiation ("UVGI") utilizes short-wavelength ultraviolet radiation (UV-C) that is harmful to microorganisms. It is effective in destroying the nucleic acids in these organisms so that their DNA is disrupted by the UV radiation, leaving them unable to perform vital cellular functions. Several devices are currently available that utilize such UVGI light to sanitize the surfaces of Electronics. These UV sanitizers typically require a user to place the Electronic Devices within a chamber with a UV light emitted by special light bulbs. Some devices may be operated using batteries, some by plugging them into a wall outlet and others may be operated by either method but all require electricity to operate making them more costly to operate and less portable. UV sanitizers are also typically larger than the Electronic Devices making them much less portable and less convenient to transport. Also, because they contain bulbs that are affected by dust or other film coatings can lower UV output and increase the time and temperature to eliminate microbes. UV sanitizers are more fragile and more susceptible to being damaged if dropped or if they sustain an impact.

Significantly, for all of the above described methods, if there is not 99.99% kill of bacteria and germs, the subsequent effectiveness of the same method on the same microbes decreases due to adaptability and evolution of the microbes. Eventually, the microbes become resistant to the cleaning agents creating a "superbug."

Most people remain completely unaware of the probability of cross-contamination on Electronic Devices and the health risks resulting, some life threatening. Cross-contamination through the Electronic Devices is known as a fomit or route of pathogens from a person to another. Although an Electronic Device may appear to be clean to the naked eye, gram-negative bacteria, fungus and viruses are not visible to the naked eye when present. Contaminants may transfer from the Electronic Devices to the user or even between several users when a single Electronic Device is shared among multiple users. In turn, it promotes the spread of gram-negative bacteria, fungus and viruses. Researchers have discovered non-porous surfaces pose the most threat to the transmission of bacteria, fungus and viruses by the pathogen forming a biofilm on the surface. Unfortunately, very few people take measures or time to clean Electronic Devices unless they are visibly dirty, such as smears/smudges on a screen, or have some form of physical dirt or debris on them (e.g. the device is sticky). Even still, the cleaning equipment and methods available and in use do not properly or thoroughly sanitize, clean and protect the Electronic Devices user ('s). Furthermore, if an individual does decide to clean an Electronic Device using, one of the aforementioned technologies, the cleaning is not done frequently enough to maintain a clean Electronic Device.

There is a strong need for an easy to use, protective barrier and cleaning device with the efficiency to work day & night for proper protection against infection. One that is conveniently transported and safe to use. A sanitizing device that eliminates contaminants (bacterial colonization) frequently found on Electronic Devices. There is a need for a storage device that also cleans and disinfects the Electronic Devices during transport, storage and non-use. There is a need for a device that holds and stores the Electronic Device with an integrated cleaning and disinfection system that eliminates the need for other liquids, chemicals, or products to achieve the cleaning results. There is a need for a device that performs all of the above and that also includes an integral smear/smudge antimicrobial removal pad for the screens on the Electronic Devices that also disinfects and cleans the biofilms off of the non-porous glass screens. There is a need for a proven device that reduces the potential for the development of antimicrobial resistance commonly encountered by microbial mutation and antibiotic resistance. There is a need for a device used multiple times without cleaning between uses and are at high risk of bacterial colonization. There is also a need for a device that avoids the pitfalls associated with less than 99.99% kill rates and the potential of microbial resistance to chemical disinfectants.

Therefore, it is an object of the invention to provide a device that can passively sanitize Electronic Devices without the use of liquids, harsh chemicals or detergents. It is also an object of the invention to provide a device that can sanitize Electronic Devices with minimal effort from its user. Yet another object of the invention is to provide a compact, portable, and completely self-contained device that can sanitize Electronic Devices without solutions, detergents, electricity, batteries or other products requiring replenishment. Another object of the invention is to provide a device that, can sanitize Electronic Devices in a short period, of time and with a high kill rate for gram-negative bacteria, fungus and viruses and germs. Another object of the invention is to provide a device that can sanitize Electronic Devices, a device proven to inhibit the growth of microbial colonization and exhibits antimicrobial activity against a broad range of micro-organisms. Still another object of the invention is to provide a device that can perform all of the above and that is easily and conveniently transported. Another object of the invention is to provide a device that is continuously reusable and which does not have adverse effects on the Electronic Device users or there environment. Another object of the invention is to provide a device that is stretchable and conforming to the shape of an Electronic Device such that a substantial amount of the surface area of the device is in contact with the Electronic Device thereby sanitizing those parts in direct contact.

In addition, another object of the invention is to have the ability to be anti-static, while also absorbing harmful emitted radiation to the user.

SUMMARY OF THE INVENTION

The present invention is an anti-microbial resistant and sanitizing pocket/case/pouch for Electronic Devices that is antimicrobial resistant meaning it inhibits the growth of microbes that are resistant to the disinfecting mechanism used. While the invention will be described in connection with certain embodiments, it will be understood that the invention is not limited to those embodiments. To the contrary, the invention includes all alternatives, modifications and equivalents as may be included within the spirit and scope of the present invention.

Advancements in textile technologies have resulted in the introduction of some fabric materials impregnated with silver, e.g., silver yarn staple to plating and coatings.

Photons on transitional metal absorption release positively charged ions, creating a thermomagnetic electrical disrupting pulse, inhibiting the enzymatic reaction as a catalyst to break down proteins for mitochondria absorption. Thus, if mitochondrion do not function properly, not only does it effect energy production of adenosine triphosphate (ATP) but also cell specific products needed for normal cell functioning will be affected.

A major advantage of these conductive silver molecularly bonded impregnated fabrics is that they can be used to sanitize the surfaces with which they conic into direct contact or substantially close contact with without the need for harmful and costly chemicals. Also, these materials do not require any man-made electricity to operate—they rely on the natural thermodynamic properties resulting in antiseptic properties by the release of the silver ions particles which are activated from the result of photon: electromagnetic radiation on transitional metals.

The present invention is a novel device for Electronic Devices made from a stretchable, molecularly bonded, conductive elastic silver isotopic containing yarn, knitted or woven into a fabric device that can be used to carry and/or store Electronic Devices and that also cleans/sanitizes the Electronic Devices.

The device according to the present invention is a stretchable and conformable fabric preferably formed in the shape of a pouch or pocket with at least one opening in the device through which the Electronic Device can be inserted and removed by its mechanical stretch. The device may include one or more cover flaps to cover the at least one opening. Alternatively, the device could include a drawstring type closure or other mechanisms to close the at least one opening. In another embodiment, the device includes a cover flap much like a knapsack that flips over the at least one opening. Preferably, the entire device is made from the same elastic, molecularly bonded, conductive silver impregnated yarn constructed into an open planar configuration for example a woven, knit fabric that is stretchable, although parts of the device may be made of other antimicrobial fabrics and/or materials for example a non-woven.

Preferably, the device is configured for a particular electronic device having a predefined and predetermined shape and size. The device stretches around the Electronic Device when the Electronic Device is inserted through the at least one opening into the device maximizing surface contact between the inside surface of the device and the surfaces of the Electronic Device. Those surfaces of the Electronic Device in contact with the device and in substantially close proximity to the devices "antimicrobial halo" (including the users hand and any surface it touches) become sanitized through the mobility and release of silver's positively charged ions that disrupt normal cell functioning of gram-negative bacteria's, viruses and fungus. Accordingly, most preferably, the device is configured smaller than the Electronic Device so that the device can stretch around Electronic Device when placed within it.

In one embodiment of the invention, the device further comprises an opening at an end on the device opposite the first opening. The second opening is intended to align with ports in the Electronic Device, such as, for example, the charging port, the headphone port, and the like. Accordingly, the user can charge the Electronic Device or listen to it while inside the device, or connect it to other Electronic Devices. The position of the second opening may vary depending on the Electronic Device and does not need to be at a location opposite the first opening.

In another embodiment, the device further comprises one or more finger pockets on the outside of the device. The finger pockets are configured to receive the tip(s) of the finger(s) (or can be configured bigger to accommodate a hand) of a user which makes holding and handling the device and the Electronic Device easier. The finger pockets are preferably made of the same silver impregnated and elastic containing knit fabric that is used for the rest of the device but need not be the same material. Each finger pocket preferably stretches to conform to the size of the finger placed within it.

In yet a further embodiment of the invention, the device further comprises a cleaning pad. The cleaning pad is comprised of a soft, hairy, looping, microfiber fabric, preferably a non-woven, containing silver particles, that can be used to clean and disinfect the sensitive non-porous screen surface of the Electronic Device (e.g., the glass). The self-cleaning pad is a quick and convenient way to safely clear away the mess without staining or damaging sensitive screen coatings. The self-cleaning pad is used to remove smears, oil, and smudges from the screen. In one embodiment, the cleaning pad is removable and replaceable from the device. Preferably, the cleaning pad is fixedly attached to the inside of the cover flap and exposed when the finger(s) or hand is inserted in the finger pockets.

In order to assist with the removal of the Electronic Device, the device of the present invention may further include a pull tab. The exposed end of the pull tab is located outside the device and can be used to help lift the Electronic Device out of the device. The pull tab is easily grasped by the user.

In yet another embodiment of the invention, the device may be integrated into an article of clothing (e.g. pants, shirts, vests, aprons, jackets) as either an internal pocket, an external pocket, or both, allowing the user to sanitize the Electronic Device, or anything else stored therein, including writing instruments, paper or coin currency, keys and the like. Alternatively, the device could be a pocket insert that can be placed into a pocket of pants or a shirt much like a pocket protector for a shirt.

In addition, the device is anti-static and helps eliminate buildup of static generally caused by the triboelectric effect. In addition, the device helps absorb emitted radiation that is harmful to the human body due to the silver isotopes characteristics in two stable (non-radioactive) forms, namely Ag-107 and Ag-109, with Ag 107 being most common in nature.

In addition, the properties of the device, namely the silver ions, provide an ability for the device to neutralize odor-causing ammonia and denatured proteins thereby creating an anti-odor or odor reducing device.

The device according to the invention eliminates up to 99.99% of bacteria directly on or in substantially close proximity within the fabric's antimicrobial halo of the device thus providing comprehensive and proactive antimicrobial protection that reduces contamination and does so without additional cleaning protocols, behavior modifications or training.

The device according to the invention, due to the semiconducting properties of the open planar configuration of the knit or woven structure acts as an amplifier of radio signals providing improved reception for Electronic Devices when in contact with the device. The device acts as a Wi-Fi Amplifier to all wireless electronic components in a frequency network. Preferably, the device has a minimum linear yarn fineness of about 15 to a maximum of about 210 denier and the natural fiber yarns having a cotton yarn count of about 15 to 150. The minimum woven thread count per inch of 140 warp×140 filling and maximum 10 warp×10 filling. Knitted minimum thread count per inch having 200 wales×200 courses and maximum 10 wales×10 courses. The device according to this configuration has the ability to harness electromagnetic waves of highly energized, friction-free electrically charged photon particles into a Euclidean vector field. The fields highly figure of merit resonating cavities amplify an intense and abrupt rapid acceleration of charged particles. Acting as a transducer, its electrical conductivity gives a boost to the electromagnetic waves towards the transmitter or radio receiver. In turn, it converts the electric power into radio waves, and radio waves into electric power when the Electrical Device is inserted into the device or is in contact with the device.

BRIEF DESCRIPTION OF THE DRAWINGS

FIG. 3 is a cross section of the invention and the Electronic Device shown in FIG. 2 taken at cut-line 3-3. FIG. 3 shows the outside surfaces of the Electronic Device fully encased and in contact with the inside of the device with the pull tab extending around the bottom of the Electronic Device, through an aperture in the front of the device, and outside the device.

FIG. 4 is an enlarged view of a portion of the device shown in FIG. 3 showing the fabric of the device in direct contact with the outside surfaces of the Electronic Device.

FIG. 5 is an enlarged view of a portion of the device shown in FIG. 3 showing the pull tab on the inside of the device, through the aperture, and extending outside the device.

FIG. 10 shows a half section depicting the Electronic Device therein and the components of the device, including the pull tab and cover flap. FIG. 11 shows the users hand on the back of the device and inside the pocket.

DETAILED DESCRIPTION OF THE INVENTION

Figure 1:
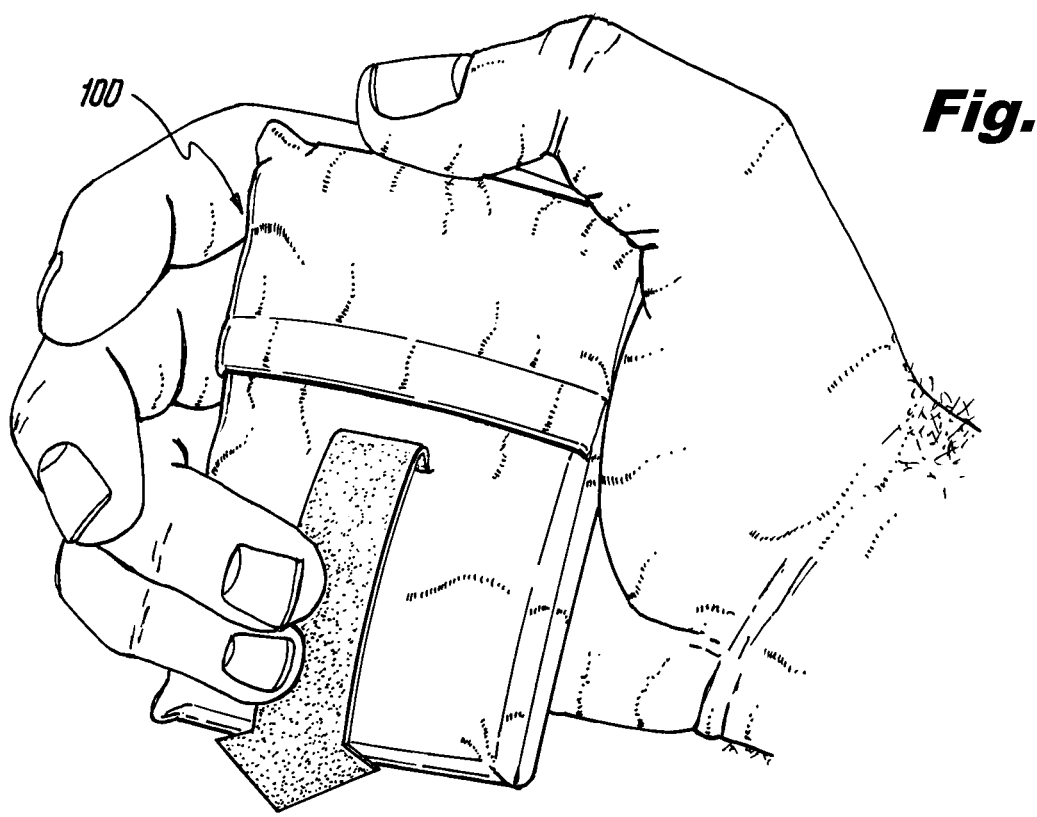
FIG. 1 is a perspective view of the device in a closed position with an Electronic Device inside held resting in the palm of a user's hand.
Figure 2:
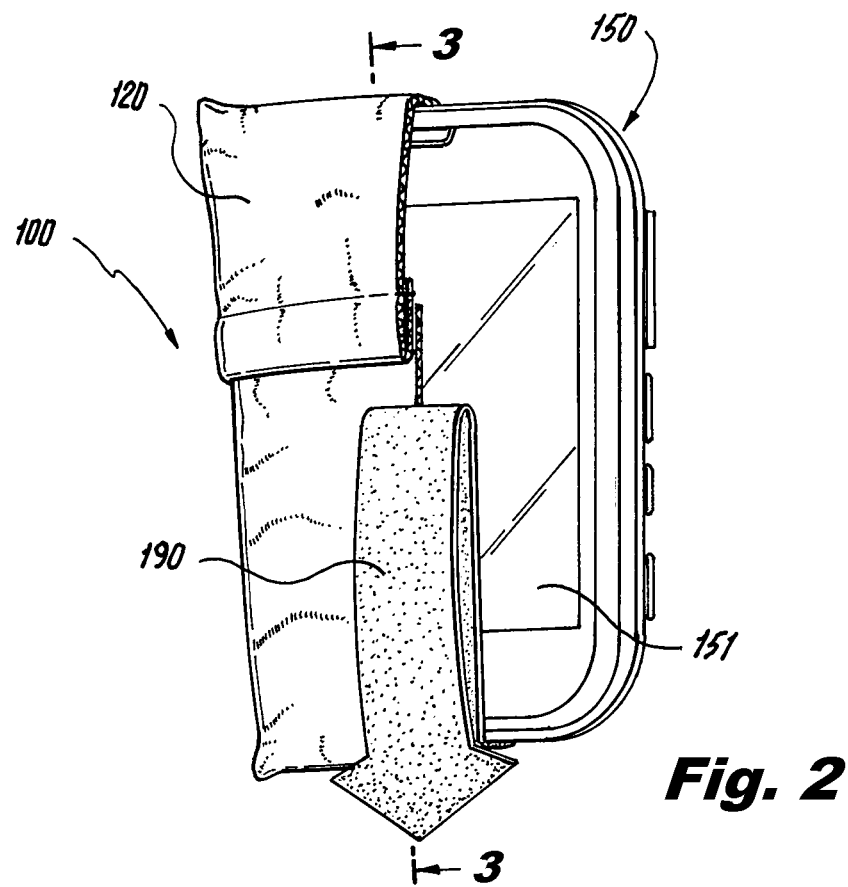
FIG. 2 is a perspective view of the device of FIG. 1 shown half section depicting the cleaning of the Electronic Device therein and the components of the device, including the pull tab and cover flap.

One embodiment of a device according to the invention is shown, in FIGS. 1-9. FIG. 1 is a perspective view of the device 100 in a closed position with an Electronic Device inside and completely enclosed in the device both resting in the palm of a user's hand. FIG. 2 is a similar perspective view of the device 100 in FIG. 1 shown in half section depicting the Electronic Device 150 within the device 100.

The device 100 is made from a stretchable (elastic), silver isotopic containing conductive yarn, produced into a knit, woven or non-woven structure/fabric that is anti-microbial, antimicrobial resistant, and capable of killing only gram-negative bacteria, fungus and viruses and germs on surfaces placed in direct contact with the fabric or substantially close to the fabric such that the silver ions can penetrate and disrupt the microbial cells ability to function and colonize on the surface of the Electronic Device. Accordingly, the device 100 of the invention is made in various sizes depending upon the predetermined Electronic Device to be used therein. The stretchable characteristics of the fabric help to maximize surface contact between the fabric and the Electronic Device and increase the efficacy of the sanitizing and electromagnetic signal amplifier properties of the device.

The device 100 is configured to receive and hold inside of it, much like a pouch or case, an Electronic Device 150. When the preselected Electronic Device 150 is placed into the device 100 made for such preselected Electronic Device 150 through an opening/aperture 110 that forms a pocket inside the device 100, the fabric of the device 100 stretches increasing the size of the device. The elasticity of the fabric maximizes (1) the surface contact between the device 100 and the Electronic Device 150 and (2) the closeness of the fabric of the device 100 to the outside surfaces of the Electronic Device 150 and crevices and indentations in the surfaces. Thus, configuring the device 100 in a substantially similar geometric shape as the Electronic Device 150 increases the effectiveness of the germ and bacteria killing functions of the device 100. The device 100 can be manufactured into any geometric shape desired, through sewing or other fabric forming and fastening techniques known in the textile industry, including welding for seams. The device 100 can be made into the shape of any predetermined Electronic Device, including an iPhone 5, a BLACKBERRY BOLD, a SAMSUNG GALAXY S111, a MACPRO computer, an iPad, a KINDLE, sex toys, etc., preferably a little smaller than the actual Electronic Device product.

Figure 7:
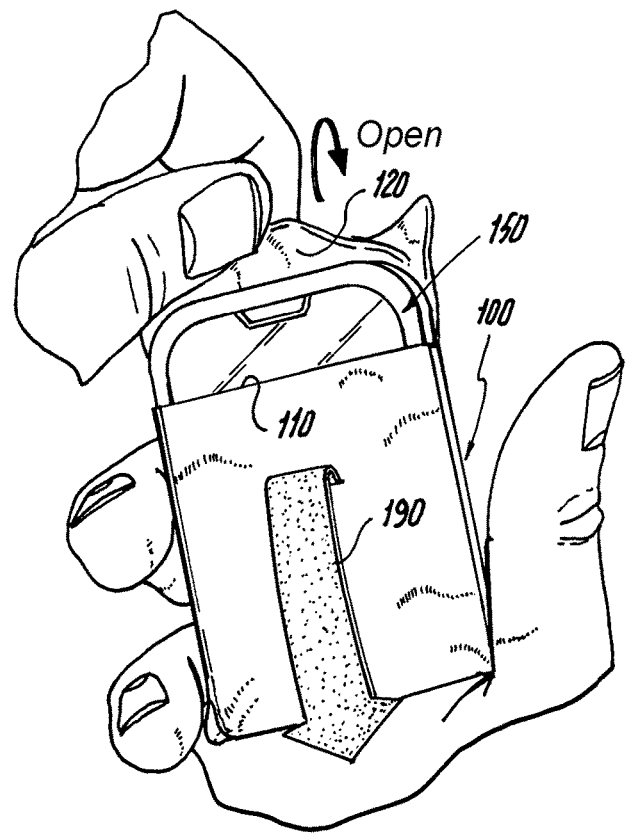
FIG. 7 is a front perspective view of the device shown in FIG. 6 depicting the opening of the cover flap over the top of the Electronic Device using the user's opposite hand.

The device 100 according to the present invention is preferably formed in the shape of a pouch or pocket. A liftable and removable cover flap 120 on the front of the device is used to access the inside of the device 100. The cover flap 120 is opened by lifting/pulling it up and over as shown in FIG. 7. The cover flap 120 covers the edge of an aperture 110 inside the device 100 which forms the top of a pocket inside the device. The aperture 110 is an opening through which the Electronic Device 150 can be inserted and removed from the device 100.

The device 100 comprises an inside accessible through the cover flap and the opening/aperture 110 in the device 100 and an outside. Preferably, the entire device 100 is made of silver fiber impregnated yarn in a planar configuration fabric but it is understood that not all embodiments of the invention require all components to include silver fiber impregnated yarn.

Preferably, all of the fabric of the device is stretchable capable of expanding when the Electronic Device 150 is placed within it and returning substantially back to its original size and shape when the Electronic Device 150 is removed from the device 100.

The embodiment of the invention shown in FIGS. 1-9 further comprises a pull tab 190. The pull tab is preferably, but need not be, also made of a silver impregnated fabric. More preferably, the fabric for the pull tab is not stretchable or elastic containing although it can be. The pull tab 190 is fixedly attached to the inside of the device 100 on the back of the device 100 and is free (unfixed) along the bottom and front of the inside of the device. Pull tab 190 extends through an aperture 111 in the front of the device 100 and hangs outside the device. In the embodiment shown in FIGS. 1-9, the portion of the pull tab 191 fixedly attached to the inside back of the device 100 can be used as a cleaning pad for the screens on the Electronic. Devices 150. The user can easily use the cleaning pad 191 to wipe down the screen thereby disinfecting it while at the same time also removing smears and smudges. Most preferably, the cleaning pad 191 is comprised of a non-woven fabric to avoid scratching the screen but it may also be a woven or knit fabric.

The present invention is not limited to a pull tab 190 having the cleaning pad 191 integral therewith. The present invention also includes removable cleaning pads also made of silver impregnated fabrics placed in the location shown by the cleaning pad 191 shown in FIG. 9 or at other locations on the device 100, including the outside of the front or back of the device 100.

As shown in FIGS. 2, 3 and 4, when the Electronic Device 150 is inside the device 100 and the cover flap 120 is closed, the exterior surfaces of the Electronic Device 150 are in contact with the inside of the device 100 or in substantially close proximity therewith. The Electronic Device 150 is completely enclosed within the device 100 with no surfaces exposed or visible.

Pull tab 190 functions much like a pull string helping the user to, if the user elects to use the pull tab 190, lift the Electronic Device 150 up and out of the pocket inside the device 100 when the cover flap 120 is in an open position.

Figure 6:
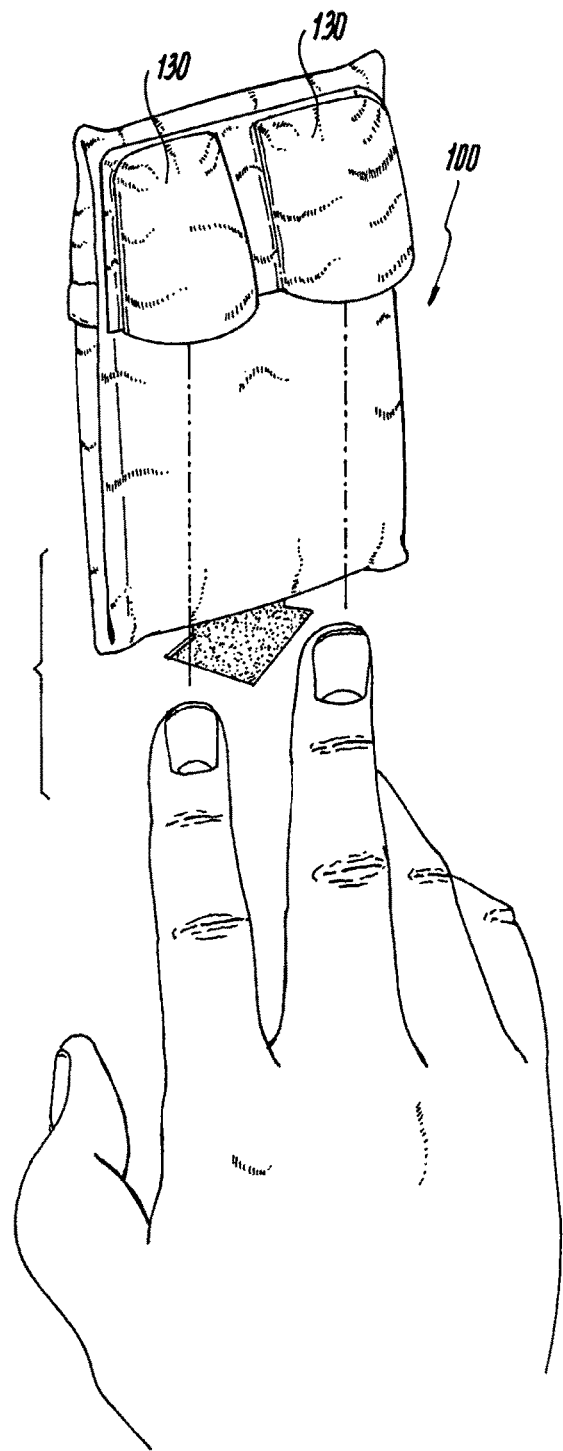
FIG. 6 is a perspective view of the rear of the device shown in FIG. 1 depicting two device controlling finger insertion pockets and a users hand and finger in position to hold the device using the finger pockets for device control and cleaning position.
Figure 8:
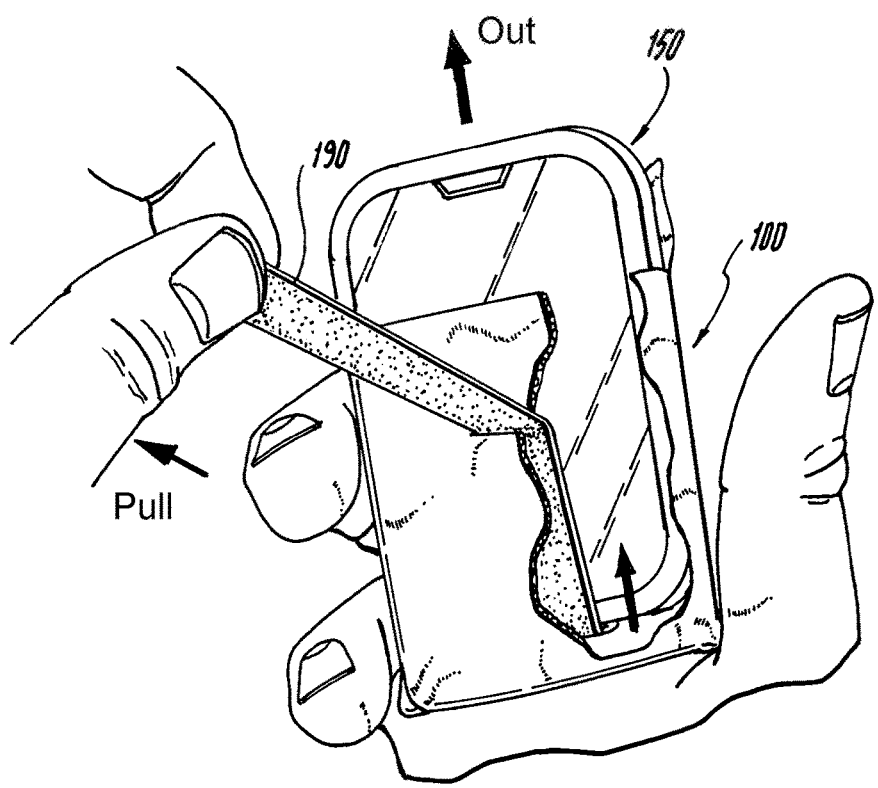
FIG. 8 is another front perspective view of the device shown in FIG. 7 with the cover flap pull back. The user is pulling the pull tab to lift the Electronic Device up and out of the device.
Figure 9:
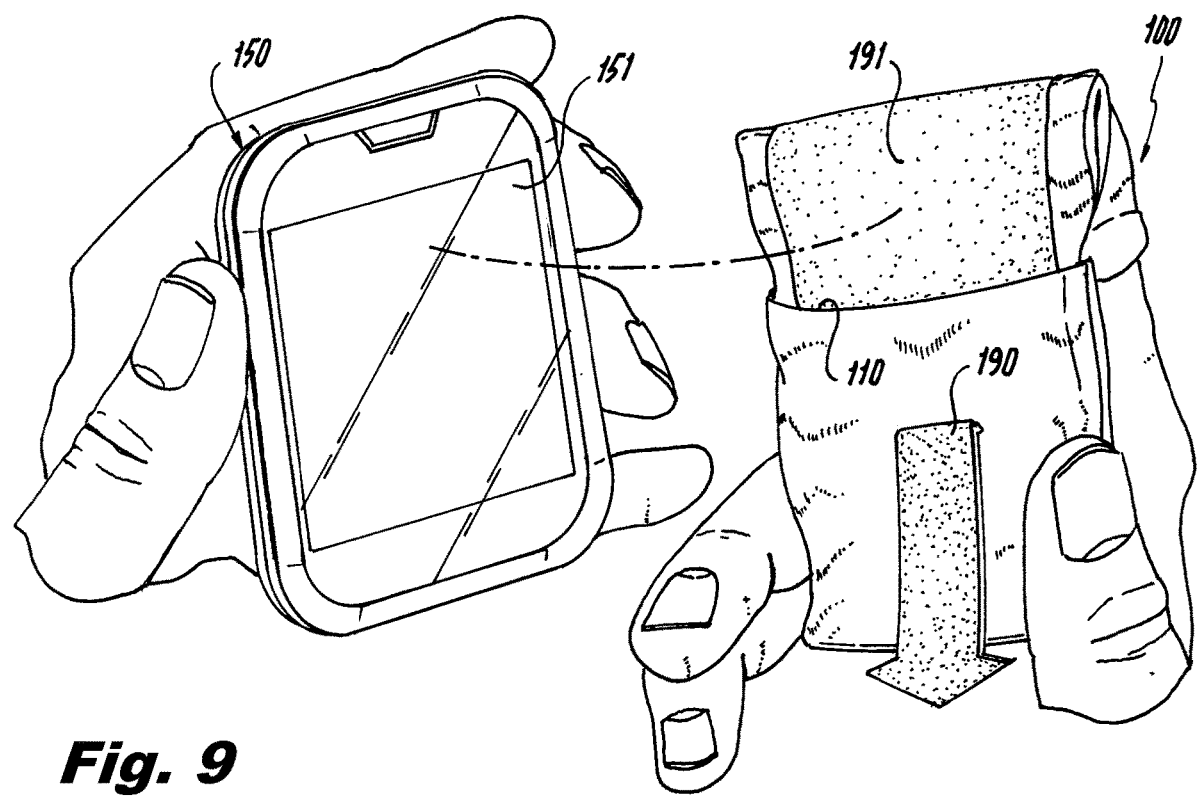
FIG. 9 shows the Electronic Device of FIG. 8 completely removed from the device with the cleaning pad exposed and usable to clean the glass screen on the Electronic Device.
Figure 11:
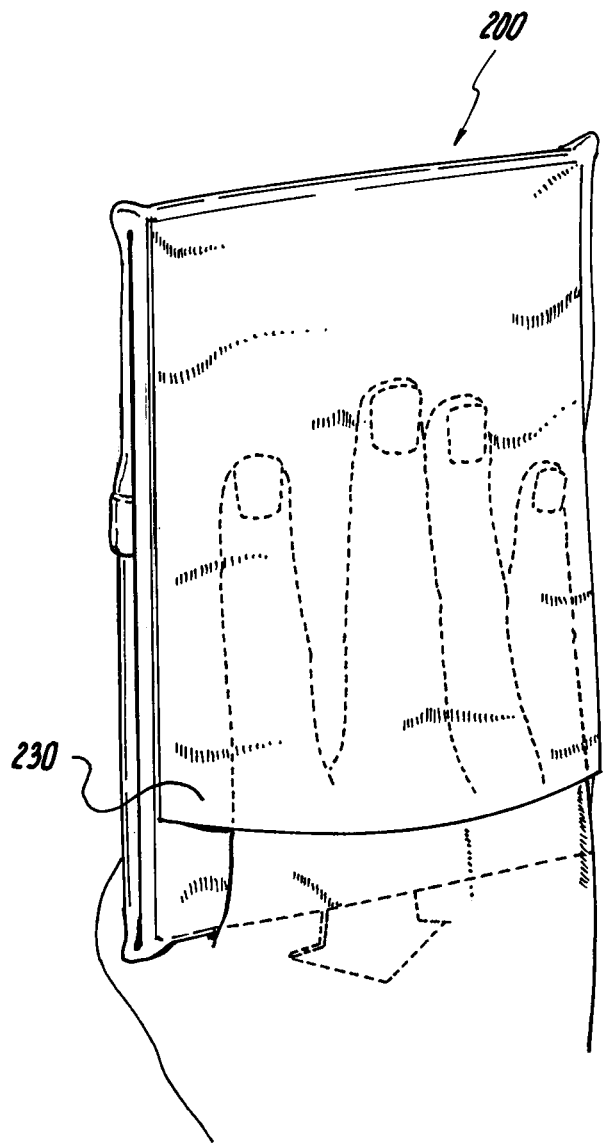
Figure 12:
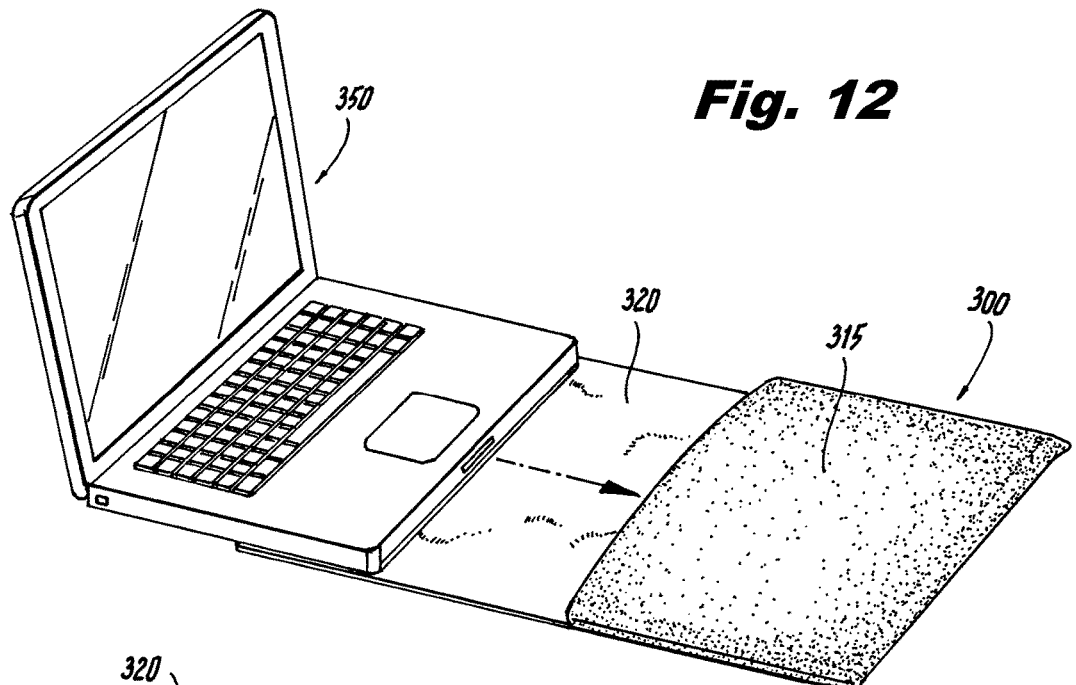
FIG. 12 is a perspective view of an alternate embodiment of the invention configured for a laptop showing the Electronic Device being inserted into the device.

For example, as shown in FIGS. 6-9, when the user wants to remove the Electronic Device 150 from the device 100, the user slides his/her fingers up along the back side of device 100 as shown in FIG. 6. In those embodiments including one or more pockets 130, the user can place one or more fingers into the pocket(s) 130 to help hold the device 130 fabric. The embodiment shown in FIG. 6 includes two finger pockets 130 on the back of the device 100. Other configurations are included within the scope of the invention including a single pocket as shown in FIG. 11 or no pocket at all. The user lifts the cover flap 120 up over the top of the Electronic Device 150 opening the device as shown in FIG. 7 exposing the top of the Electronic Device 150 and, depending upon the type of Electronic Device 150, perhaps also exposing part of the screen 151. The user can then pull the pull tab 190 thereby lifting the Electronic Device 150 up and out of the inside pocket of the device 100 as shown in FIG. 8. Alternatively, the user can grasp the top of the Electronic Device 150 with fingers and pull it out of the device 100. Once the Electronic Device 150 is removed from the device 100, the user can use the Electronic Device 150.

If desired, the user can wipe the cleaning pad 191 over the screen to clean and disinfect it. When done using the Electronic Device 150, the user can put it back into the device 100 by inserting the bottom of the Electronic Device 150 through the opening/aperture 110 and into the pocket of the device and then lifting the cover flap 120 over the top of the Electronic Device 150 thereby closing the device 100. Once back in the device 100, the silver impregnated fabric cleans and disinfects the Electronic Device 150 inhibiting the growth of bacteria, viruses and fungus on its surface(s).

While the embodiment of the device in FIGS. 1-9 shows two loose-type pockets 130 on the outside back of the device 100, the invention also includes "tight"" compression pockets made of elastic and stretchable material such as shown in the embodiment in FIG. 11. Most preferably, the pockets 130 are also made of a silver impregnated fabric to inhibiting the growth of bacteria, viruses and fungus in the pocket 130.

Although not shown in the Figures, the invention further includes apertures (openable slots) on the side(s), top, and/or bottom of the device 100, positioned to align with the ports in the preselected Electronic Devices such as, for example, the headphone port, the charger port, etc. to allow the use of these ports while the Electronic Device 150 is stored and being cleaned within the invention.

Figure 10:
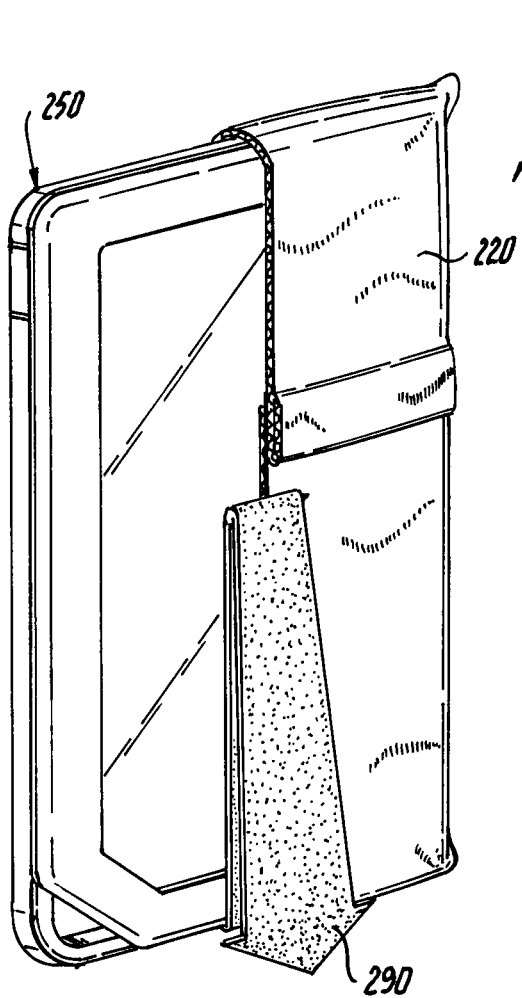
FIGS. 10 and 11 show another embodiment of the device with a single pocket on the rear of the device.

Another embodiment of the invention shown in FIGS. 10 and 11 is configured for Electronic Devices 250 such as an iPad or a tablet. The device 200 includes pull tab 290, cover flap 220 and elastic pocket 230. Further, as for the embodiment shown in FIG. 9, the embodiment of the device shown in FIG. 9 can include an attached or detachable antimicrobial non-woven cleaning pad 191 for cleaning the screen (not shown in FIG. 9).

Figure 13:
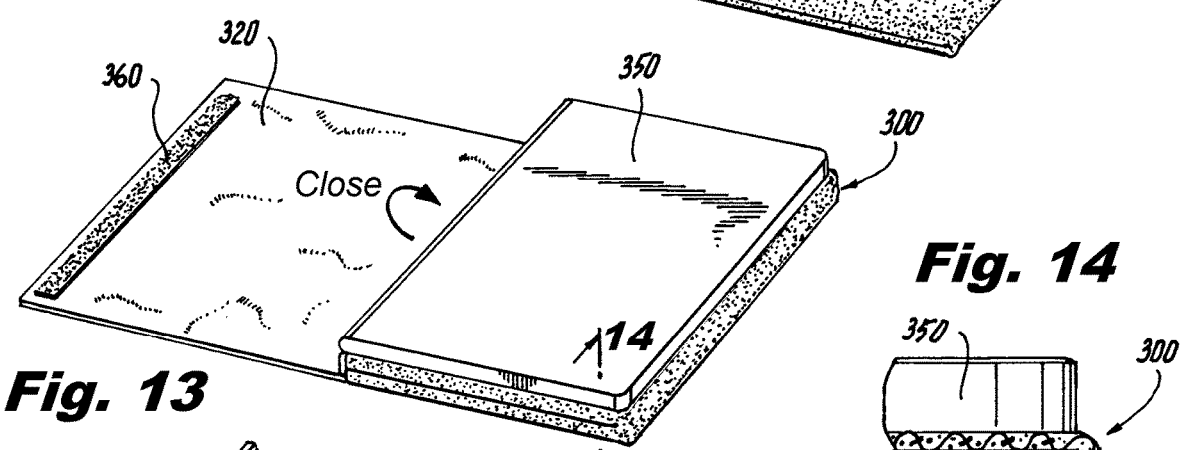
FIG. 13 is a perspective view of the embodiment shown in FIG. 12 with the Electronic Device in a closed position.
Figure 14:
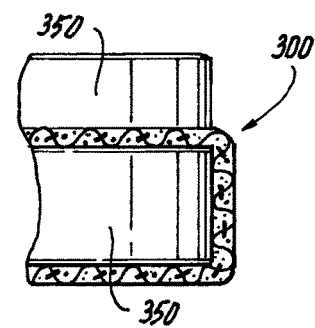
FIG. 14 is an enlarged view of a portion of the device and Electronic Device shown in FIG. 13 at line 14-14.
Figure 15:
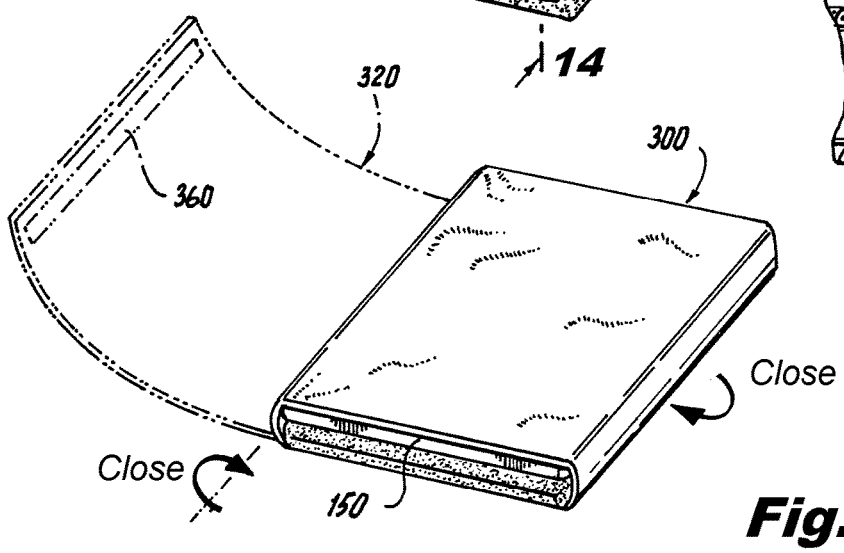
FIG. 15 is a perspective view of the device shown in FIG. 12 showing the cover flap in an open position and also in a closed position over the Electronic Device.

Another embodiment of the invention configured for a laptop is shown in FIGS. 12-15. Device 300 comprises a pocket portion 315 and a cover flap 320. The laptop, in an open position is placed into the pocket portion 315 such that the entire keyboard surface, including the keyboard and the mouse pad is placed in contact with the silver impregnated fabric thereby cleaning the entire surface. Once the laptop is fully inserted as shown in FIG. 14, the laptop is closed putting the screen in contact with the fabric. The cover flap 320 is then closed over the top of the laptop (the outside of the laptop) as shown in FIGS. 13 and 14. In a preferred embodiment, as shown in FIGS. 13 and 14, the device includes a fastening device 360 on the inside surface of the cover flap 320 that removably secures to the outside of the pocket portion 315 of the device 300. Hook and loop material, such as Velcro, for example, can be used on both the cover flap 320 and the pocket pouch 315 to removably secure/connect the cover flap 320 to the pocket portion 315. Other fasteners such as buttons, latches, and locks can also be used in place of hook and loop material.

Using the device 300 in this configuration for Electronic Devices like laptops, cleans the entire laptop during storage including the most important surfaces, namely the keyboard, the mouse pad, and the screen. As for other embodiments, a cleaning pad can be included in this embodiment on, for example, the cover flap 320. As for the prior embodiments, this embodiment could include one or more apertures through the exterior of the device to access the Electronic Device's ports (e.g. USB port, power port, etc.) while the Electronic Device 350 is inside the invention being cleaned. It is further understood that the geometric dimensions of the device can vary to accommodate laptops of varying sizes.

Figure 16:
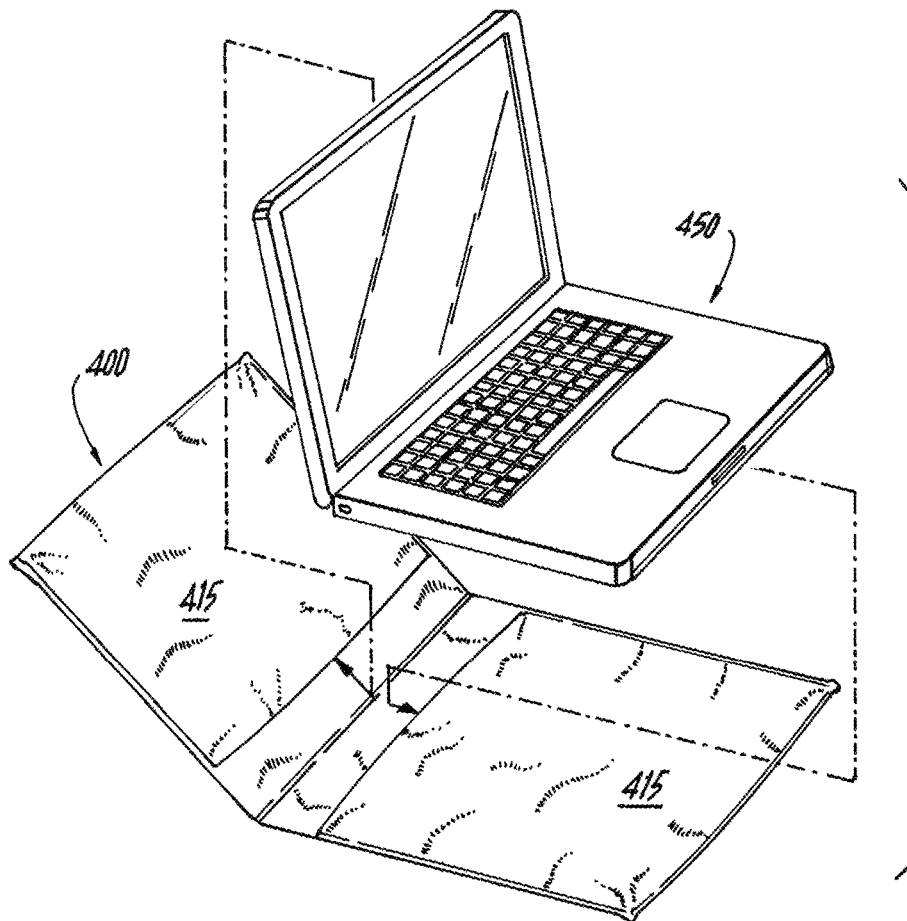
FIGS. 16 through 18 are an alternative embodiment of the device of the invention configured for a laptop showing the Electronic Device outside the device (FIG. 16), inside the device (FIG. 17) and in cross sectional view (FIG. 18).
Figure 17:
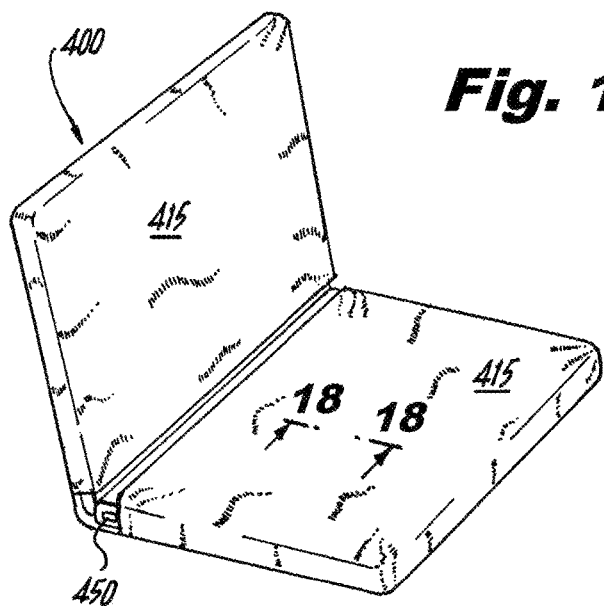
Figure 18:
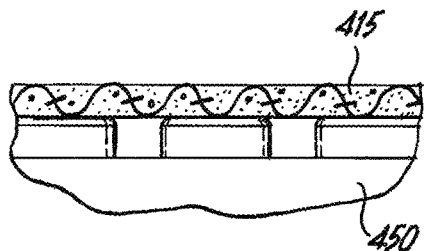

An alternative embodiment for laptops is shown in FIGS. 16-18. For the embodiment shown in FIGS. 16-18, the two sides of the Electronic Device 450 are each inserted into pockets 415 on either side of the device 400 putting the laptop screen and keyboard in direct contact with the device as seen in the cross sectional view shown in FIG. 18.

Using the device 400 in this configuration for Electronic Devices like laptops, cleans the entire laptop during storage including the most important surfaces, namely the keyboard, the mouse pad, and the screen. A cleaning pad can be included in this embodiment on, for example, the pocket 415. As for the prior embodiments, this embodiment could include one or more apertures through the exterior of the device to access the Electronic Device's ports (e.g. USB port, power port, etc.) while the Electronic Device 450 is inside the invention being cleaned. As for all other embodiments, it is further understood that the geometric dimensions of the device can vary to accommodate laptops of varying sizes and will be set according to the geometric configuration of the selected/predetermined Electronic Device.

Another embodiment of the invention (not shown) is a device in the shape of a bag pouch with a drawstring type closure or elastic/rubber band type closure. The closure is positioned along one end of the device, an open end with an aperture, allowing the top of the device to open for insertion of the Electronic Device and for closure once the Electronic Device is fully inserted. When a drawstring is included, the drawstring may further include a locking mechanism. The elastic properties of the fabric from which the device is made of allows the device to stretch and conform to the contours and surfaces of the Electronic Device.

The device according to the invention may be manufactured out of a single piece of elastic electrically conductive yarn into a fabric that is folded and sewn onto itself or formed from more than one price of fabric that is sewn together or seamed using currently known technologies.

In yet another embodiment of the invention, the device may be integrated into an article of clothing (e.g. pants pocketing, shirt pocketing, vests pocketing, aprons pocketing, jackets pocketing/automobile pocketing) as either an internal pocket or an external pocket, allowing the user to sanitize an Electronic Device or anything else placed into the device.

The fabric according to the invention is not limited to just silver impregnated fabrics. The fabric according to the invention also includes fabric impregnated with other transitional metals, such as, for example, copper, which can be used as a biocidal and conductive metal.

I claim:

1. A sanitizing pouch for a handheld electronic device, having a three-dimensional form, comprising a silver impregnated elastic conducive yarn manufactured into a fabric configured in substantially the form of the electronic device, said pouch comprising a front, a back, a top, a bottom, an interior and an exterior,
   Wherein, the silver fiber impregnated yarn is configured to permit reception of an electromagnetic signal within the interior of the pouch.

2. The pouch according to claim 1, wherein all sides of said electronic device are surrounded and in direct contact with said interior of said pouch when said electronic device is placed within said pouch.

3. The pouch according to claim 1, wherein colonization of bacteria, viruses and fungus on said electronic device are inhibited while said electronic device is in said pouch.

4. The pouch according to claim 1, wherein said back of said pouch includes at least one pocket configured to receive at least one finger of a user's hand.

5. The pouch according to claim 4, wherein said back of said pouch includes two pockets each configured to receive a finger of a user's hand.

6. The pouch according to claim 1, further comprising a cleaning pad, comprised of a fabric impregnated with silver particles, removably attached to said interior back of said pouch.

7. The pouch according to claim 1, further comprising at least one aperture on said bottom of said pouch configured to mechanically stretch around connectors and wires placed through said pouch.

8. The pouch according to claim 1, said pouch further comprising a pull tab made of a fabric impregnated with silver particles having a first end fixedly attached to said interior of said back of said pouch and extending through an aperture below said cover flap in said front of said pouch with a second end exposed exterior of said pouch.

9. The pouch according to claim 8, wherein said first side of said pull tab includes a cleaning pad comprised of a fabric impregnated with silver particles.

10. The pouch according to claim 1, further comprising hook and loop strips attached to said cover flap and attached to said exterior of said pouch under said cover flap to attach said cover flap down on said exterior of said pouch.

11. The pouch according to claim 1, wherein said fabric is a knit fabric.

12. The pouch according to claim 1, wherein said fabric is a woven fabric.

13. The pouch according to claim 1, wherein said fabric is a non-woven fabric.

14. The pouch according to claim 1, wherein electronic signals passing through at least one layer of silver impregnated fabric and entering into the interior of the pouch are boosted in strength compared to electronic signals from the same source which have not passed the fabric of the pouch.

15. The pouch according to claim 1, wherein said the electronic device is a cell phone.

16. The pouch according to claim 1, wherein said the electronic device is a PDA.

17. The pouch according to claim 1, wherein said the electronic device is a tablet.

18. The pouch according to claim 1, wherein said the electronic device is a media player.

19. The pouch according to claim 1, wherein said the electronic device is a walkie-talkie.

20. The pouch according to claim 1, wherein said the electronic device capable of sending a signal by WIFI.

\* \* \* \* \*